United States Patent [19]

Voll et al.

[11] 4,396,568

[45] Aug. 2, 1983

[54] METHOD FOR THE MANUFACTURE OF A RELIEF-LIKE PROFILED OUTER SOLE OF A CROSS-LINKED ETHYLENE-CO-VINYL ACETATE (EVA) FOAMED WITH CLOSED CELLS

[75] Inventors: Rüdiger Voll, Mannheim; Walter Hoche, Weinheim; Gerhard Graab, Mannheim, all of Fed. Rep. of Germany

[73] Assignee: Firma Carl Freudenberg, Weinheim, Fed. Rep. of Germany

[21] Appl. No.: 284,492

[22] Filed: Jul. 17, 1981

[51] Int. Cl.³ ............... B29D 27/00; B32B 31/12; B29C 17/12

[52] U.S. Cl. .................. 264/134; 264/157; 264/160; 264/162; 264/321

[58] Field of Search ............ 264/321, 160, 157, 134, 264/162

[56] References Cited

U.S. PATENT DOCUMENTS

| | | | |
|---|---|---|---|
| 3,212,242 | 10/1965 | Florine | 264/160 X |
| 3,446,880 | 5/1969 | Enicks | 264/321 X |
| 3,544,675 | 12/1970 | Belle Isle | 264/321 |
| 3,812,225 | 5/1974 | Hosoda et al. | 264/321 X |
| 3,819,796 | 6/1974 | Webster et al. | 264/321 |
| 4,187,621 | 2/1980 | Cohen | 264/321 X |
| 4,241,189 | 12/1980 | Shelden et al. | 264/321 X |
| 4,247,513 | 1/1981 | Liu | 264/321 X |
| 4,281,039 | 7/1981 | Miura et al. | 264/321 X |

FOREIGN PATENT DOCUMENTS

| | | | |
|---|---|---|---|
| 1685383 | 3/1972 | Fed. Rep. of Germany | |
| 843483 | 8/1960 | United Kingdom | 264/160 |

Primary Examiner—Philip E. Anderson
Attorney, Agent, or Firm—Kenyon & Kenyon

[57] ABSTRACT

Method for the manufacture of a relief profiled outer sole of cross-linked EVA polymer foamed with closed cells is described in which the polymer used is formed into a cross-linked, expanded tempered blank, split by at least one cut into several subblanks, and whereupon the surface of a subblank is heated and pressed to form the relief profile. The temperature gradient of the blank while it is being pressed is important for precise formation of the relief profile.

4 Claims, 4 Drawing Figures

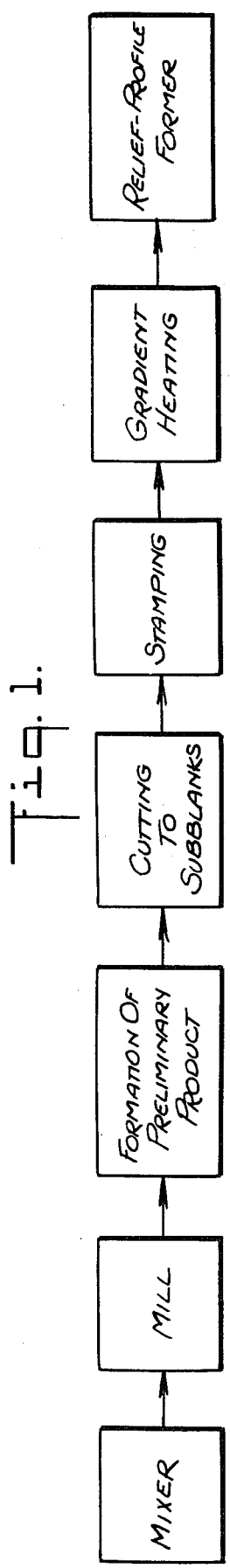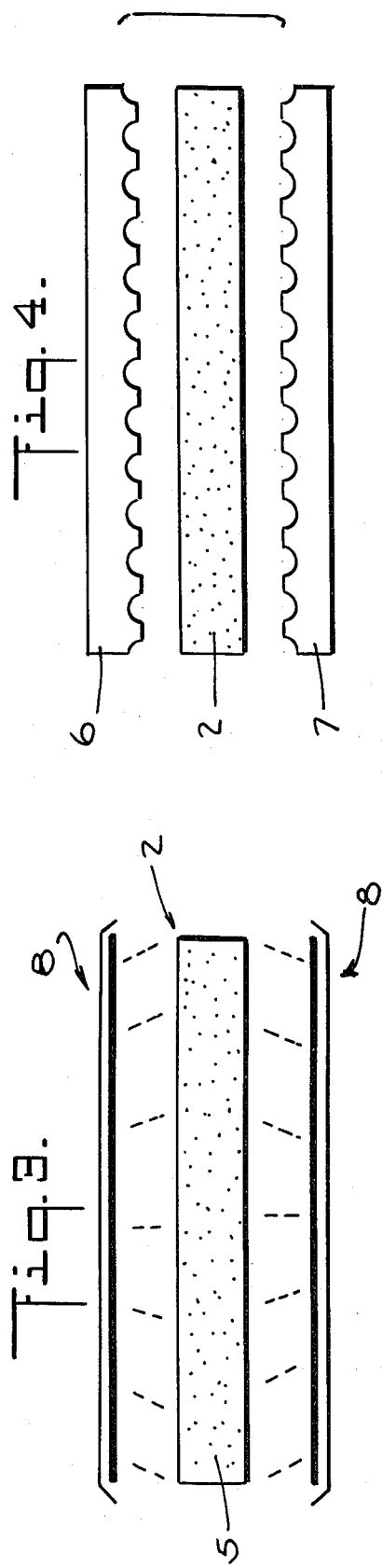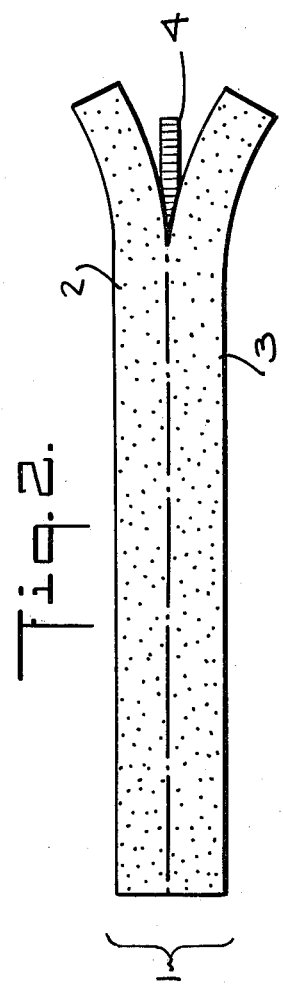

METHOD FOR THE MANUFACTURE OF A RELIEF-LIKE PROFILED OUTER SOLE OF A CROSS-LINKED ETHYLENE-CO-VINYL ACETATE (EVA) FOAMED WITH CLOSED CELLS

BACKGROUND OF THE INVENTION

The invention relates to the use of ethylene-co-vinyl acetate (EVA) for the manufacture of outer soles of shoes. The vinyl acetate content of the polymer material used is 14 to 28% and materials of this type are distinguished by especially high flexibility, low weight, good wear behavior and ability to be dyed.

In German Offenlegungsschrift No. 16 85 383, a method for the manufacture of a profiled sole of elastomer with a pore structure is described, in which a quantity of the elastomer mixture corresponding to the size of the sole is placed in the sole mold which during this process is larger than the volume of the finished sole. The elastomer mixture is subsequently distributed uniformly in the hollow mold by raising a bottom plunger and is foamed to the final dimension during the subsequent slow lowering of the bottom plunger. The finished sole can then be taken from the hollow mold and is characterized by the finely developed uniform pore structure. The mentioned method nevertheless has found no acceptance because the sequence of the individual operations is time-consuming and precludes mass production at low cost. Corresponding use with repect to the manufacture of a profiled outer sole of EVA is not possible for this reason.

In Austrian Patent Application No. 67 57/78, a method for the manufacture of a molded shoe part with a relief-like structured surface of a cross-linked polyolefin foamed with closed cells is described. For this purpose a foam material blank with specific dimensions is first formed from the material used and then formed in the desired manner into a mold through the use of a combined heat-pressure treatment. This results in heavy densification of the foam material blank over the entire cross section, and as a consequence, in an increase of the specific gravity and an impairment of the flexibility. The pore size and distribution vary extremely as a function of the degree of densification, which is detrimental with respect to the wear behavior. For this reason, an outer sole cannot be made in this manner. The processing of EVA is not mentioned in the cited literature reference.

It is, therefore, an object of the invention to develop an efficient method for the mass production of a profiled outer sole of a cross-linked EVA foamed with closed cells, which ensures the achievement of a homogeneous and uniformly fine pore structure. Such soles are commonly known as waffle soles, "Vibram" ® soles and other similar types with lugs, ridges or other gripping features on the bottom of the sole. It is desired thereby to achieve the manufacture of an outer sole which is distinguished by high flexibility with low weight and good wear behavior.

SUMMARY OF THE INVENTION

According to the invention, there has been developed a method for manufacturing a relief-like profile outer sole of cross-linked EVA foamed with closed cells. The method comprises foaming and crosslinking the EVA into a sole blank, tempering the blank, splitting it horizontally into subblanks by at least one cut, heating the surfaces of a subblank to a temperature of from about 120° C. to about 200° C. wherein the temperature at the depth of the relief profile does not exceed 75° C., and pressing the heated surfaces with a molding plunger heated to about 65° C. to 80° C. to produce a relief profile blank which can be shaped and sized to form an outer sole.

BRIEF DESCRIPTION OF THE DRAWINGS

FIG. 1 is a block diagram illustrating the various sequential steps of a process according to the present invention, with particular reference to the processes set forth in Examples I and II;

FIG. 2 is a schematic representation of the horizontal splitting of a sole blank into two subblanks utilizing a cutting knife;

FIG. 3 is a schematic representation of the heating of a subblank using infrared radiators; and FIG. 4 is a schematic representation of the heated subblank preparatory to formation of a relief profile on both surfaces thereof using molding elements with appropriately shaped relief structure.

DETAILED DESCRIPTION OF THE INVENTION

Contrary to known methods, the method of the invention makes it possible to structure in relief-fashion, i.e., with lugs, ridges, waffles or similar raised surfaces, without appreciably increasing the specific gravity. This preserves the original homogeneous and uniformly fine pore structure which is of particular advantage with respect to the use properties of an outer sole for footwear.

The necessary sole blanks of cross-linked EVA foamed with closed cells can be formed and vulcanized in the customary platen presses. By uniformly mixing-in an expansion agent with a decomposition point below the vulcanizing temperature, a spontaneous increase of the volume to about three times the original volume is obtained while developing the desired fine pore structure. The surfaces are smooth and flat and it is therefore not necessary to rework them additionally by removal of material prior to further processing. Due to the closed pore structure, the surfaces are completely closed in themselves. The pore diameter varies between 30 and 100 $\mu$m, with an average of 60 $\mu$m.

By mechanically splitting the sole blank into several blanks, the basically closed pores arranged in this region are opened and a velvet-like appearance results, which differs distinctly from that of the surfaces facing the plates of the press during the vulcanizing operation. However, this change is not accompanied by a detrimental change of the mechanical properties and it is therefore possible to sort the subblanks by fashion or style aspects. This, of course, does not preclude equalizing the appearance of the surfaces by additional grinding or coating with elastomer materials if desired.

In order to accomplish properly the subsequent relief profiling step, it is necessary to heat the blanks or subblanks so that the claimed temperature gradient is preserved over the range of the later profile depth. This can be realized most simply by using a high-energy infrared radiator. The heated subblanks are then plunger pressed with a molding tool to form the relief profile. The cycle time for the subsequent profiling of the surface with a molding tool is relatively short and is only a few seconds. Appreciable rebound of the impressed profile after the pressure plunger was removed is not observed and from the resulting profiled subblanks, outer soles of the desired shape and size can be stamped, using customary processes.

It is also possible to profile both surfaces of the subblanks, using an appropriate method, for instance, in order to obtain better adhesion during the cementing to the inner sole. In general, however, such a procedure is not necessary, and profiling of the walking surface on one side is sufficient.

In the following examples, the present invention will be explained in greater detail.

EXAMPLE 1

The components given in the following table were placed in an internal mixer and were mixed for about eight minutes at a temperature of 120° C. to form a homogeneous mass. The data in percent refer to the respective content of the individual components in the total weight of the finished product:

| | |
|---|---|
| Ethylene-co-vinyl acetate with a vinyl acetate content of 20% | 60% |
| Silica, precipitated | 17 |
| Calcium carbonate, coated | 13 |
| Zinc soap of a fatty acid as a processing aid | 2.5 |
| Azodicarbonamide as a foaming ageent | 1.7 |
| Iron oxide pigment as the coloring agent | 5.4 |

After complete homogenization, the foregoing mixture was taken from the internal mixer and was further processed in a friction mill at a temperature of 70° C. The composition was completed by the addition of 0.4% by weight of an $\alpha,\alpha'$-bis-(t-butylperoxy)—diisopropylbenzene as a cross-linking agent to 100%.

The preliminary product obtained was formed into an uncross-linked, sheet 2.3 cm thick with a length of 82 cm and a width of 58 cm. The size corresponded exactly to the size of the cavity of the blank molding tool which was preheated to a temperature of 170° and into which the sheet was subsequently placed. The tool was closed immediately and a pressure of at least 70 kg/cm² was applied. The sheet contained therein was heated-through for 15 minutes at the indicated temperature. This brought about the vulcanization and activated the expansion agent contained in the sheet.

At the end of the indicated time the tool was opened and the expansion agent, decomposed by the action of the mentioned temperature, had made the sheet expand into a sole blank of 120×85 cm with a thickness of 3.4 cm. The blank was placed in a tempering oven heated to a temperature of 80° C. and was fully vulcanized during a period of 6 hours. The specific gravity was 0.35 g/cm³ after cooling down.

The blank (element 1 of FIG. 2) obtained in this manner was subsequently cut apart into the subblanks 2 and 3, each of which was 6 mm thick by means of a belt knife 4. From one such subblank 2 an outline 5 with a size of 30×20 cm was stamped out and irradiated by means of an infrared black-light radiator 8 for a period of 2.5 seconds with a power of 6.5 W/cm². At the surface, a temperature of 130° C. was obtained, and at a depth of 3 mm below the surface, a temperature of 70° C.

The blank warmed up in this manner was immediately transferred into a relief-profile forming plunger press tool and given a surface profile. The tool plunger (6,7 of FIG. 4) used consisted of steel which had been heated to a temperature of 80° C. The profile consisted of columnar recesses, arranged at a mutual distance of 12 mm, with a diameter of 5 mm and a depth of 3 mm.

A pressure of 6 kg/cm² was used with a dwelling time of the blank in the plunger tool of 10 seconds. The surface was formed in the process in accordance with the shape of the plunger tool and was distinguished by especially good contour sharpness. After cooling, the specific gravity was 0.37 g/cm³ and thus was nearly unchanged.

EXAMPLE II

The procedure described under Example I was repeated, using a plunger press tool with a plunger surface structured in relief-fashion of recesses in the shape of truncated pyramids. The recesses were immediately adjoining and had a depth of 3 mm with a side length of 4 mm. Also this molding pattern was transferred with sharp contours on the loaded-in blank. The specific gravity was 0.36 g/cm³ and was therefore almost unchanged. The pore structure was distinguished by nearly unchanged excellent homogeneity.

EXAMPLE III

A Comparative Sole made from a Uniformly Heated Blank

A blank with a size 30×20 cm according to Example I was placed into a heating chamber for generating a special temperature gradient and was heated up there to a temperature of 130° C. equalized over the entire cross section, i.e., the internal temperature of the blank was the same as the external temperature. The sheet was subsequently transferred to the plunger press tool and structured at the surface, using the press tool described in Example I and by applying the same conditions. The pattern obtained had by poor contour sharpness and the specific gravity had risen to the undesirably value of 0.56 g/cm³. The flexibility and the wear behavior also did not meet the requirements demanded of a good outer sole material.

We claim:

1. A method for the manufacture of a relief profile outer sole of cross-linked EVA polymer foamed with closed cells, which comprises: splitting horizontally a shaped blank of foamed, cross-linked polymer by at least one cut into several subblanks, heating one or both surfaces of a subblank to a temperature of at least 120° C. to about 200° C. wherein the internal temperature of the subblank at a depth which corresponds to the depth of the desired profile does not exceed 75° C., and pressing the heated surface of the subblank with a relief profile forming plunger press tool wherein the tool plunger is heated to a temperature of 65° to 80° C.

2. A method according to claim 1 wherein the surface of the blank is ground-off before it is heated.

3. A method according to claim 1 or 2 wherein the mechanically processed surfaces are coated, before being heated, with a continuous file, 0.1 to 0.3 mm thick, of a elastomer material.

4. A method according to claim 3 wherein the elastomer material is polyurethane.

* * * * *